(12) United States Patent
Weagle et al.

(10) Patent No.: US 10,737,212 B2
(45) Date of Patent: Aug. 11, 2020

(54) DEVICE AND METHOD FOR REMOVAL OF POLLUTANTS FROM GAS STREAMS

(71) Applicant: PURE DRAGON ENVIRONMENTAL LTD., Edmonton (CA)

(72) Inventors: Glenn Eric Weagle, Edmonton (CA); Keith Maurice Duhaime, Beaumont (CA); Allan Robert Danroth, Edmonton (CA)

(73) Assignee: Pure Dragon Environmental Ltd., Edmonton, AB (CA)

( * ) Notice: Subject to any disclaimer, the term of this patent is extended or adjusted under 35 U.S.C. 154(b) by 252 days.

(21) Appl. No.: 15/492,978

(22) Filed: Apr. 20, 2017

(65) Prior Publication Data

US 2017/0304768 A1    Oct. 26, 2017

Related U.S. Application Data

(60) Provisional application No. 62/326,452, filed on Apr. 22, 2016.

(51) Int. Cl.
*B01D 53/04* (2006.01)
*B01D 45/04* (2006.01)

(52) U.S. Cl.
CPC ......... *B01D 53/0431* (2013.01); *B01D 45/04* (2013.01); *B01D 2253/102* (2013.01);
(Continued)

(58) Field of Classification Search
CPC ............... B01D 45/04; B01D 53/0431; B01D 53/0415; B01D 2253/102; B01D 2257/30;
(Continued)

(56) References Cited

U.S. PATENT DOCUMENTS 2,728,409 A    12/1955    Smith
3,064,819 A *  11/1962    Jones ............... F25B 43/003
                                              210/266
(Continued)

FOREIGN PATENT DOCUMENTS

EP    1102620 B1    9/2003
WO    2014076451 A2    5/2014

OTHER PUBLICATIONS

Screen Shot—PureAir Filtration VRF(TM) Vortex Radial Flow System—www.pureairfiltration.com/products/pureair-vrf-vortex-radial-flow-system/.
(Continued)

*Primary Examiner* — Frank M Lawrence, Jr.
(74) *Attorney, Agent, or Firm* — Field LLP (57) ABSTRACT

A filtering device is provided for filtering pollutants from a gas stream. The device includes a cartridge comprising an inner perforated passage, an outer perforated jacket, one or more non-perforated ends and a sorbent bed contained between the inner passage and the outer jacket; and a outer shell containing the cartridge and having a first port in fluid communication with the inner perforated passage and a second port in fluid communication with the outer perforated jacket. A flowpath of the gas stream into any one of the first port or the second port, through the sorbent bed and out of the other of the first port or the second port is a bidirectional flowpath. A method is further provided for filtering pollutants from a gas stream. The method includes the steps of allowing the gas stream to flow into a filtering device in a first direction, the device comprising a cartridge having a sorbent bed contained therein; directing the gas stream to bend in a second direction differing from the first direction as it enters the sorbent bed; and allowing the gas stream to pass through the sorbent bed and to exit the device.

25 Claims, 6 Drawing Sheets

(52) U.S. Cl.
CPC .... *B01D 2257/30* (2013.01); *B01D 2257/304* (2013.01); *B01D 2257/306* (2013.01); *B01D 2257/708* (2013.01); *B01D 2257/7025* (2013.01); *B01D 2257/7027* (2013.01); *B01D 2258/06* (2013.01); *B01D 2259/4516* (2013.01)

(58) Field of Classification Search
CPC ........ B01D 2257/304; B01D 2257/306; B01D 2257/7025; B01D 2257/7027; B01D 2257/708; B01D 2258/06; B01D 2259/4516
USPC .......... 96/111–113, 108, 121, 131, 147, 148, 96/151
See application file for complete search history.

(56) References Cited

U.S. PATENT DOCUMENTS

| | | | | |
|---|---|---|---|---|
| 3,429,656 A | * | 2/1969 | Sinfelt | B01D 53/8603 423/213.2 |
| 3,747,303 A | * | 7/1973 | Jordan | B01D 53/0431 55/318 |
| 4,322,230 A | * | 3/1982 | Schoen | B01D 46/2411 29/455.1 |
| 4,559,066 A | * | 12/1985 | Hunter | B01D 46/0004 55/498 |
| 4,838,901 A | * | 6/1989 | Schmidt | B01D 46/0024 55/320 |
| 5,288,469 A | * | 2/1994 | Skalla | A61B 18/00 261/DIG. 26 |
| 6,152,996 A | * | 11/2000 | Linnersten | B01D 46/0024 55/385.3 |
| 6,381,983 B1 | * | 5/2002 | Angelo | B01D 53/261 210/435 |
| 7,311,763 B2 | * | 12/2007 | Neary | B01D 53/0415 95/133 |
| 7,736,419 B2 | * | 6/2010 | Van Niekerk | A61L 9/014 95/108 |
| 8,262,782 B2 | | 9/2012 | Schlaechter | |
| 2013/0292001 A1 | | 11/2013 | Scott | |

OTHER PUBLICATIONS

Peterson, Gregory W., et al., Novel Collective Protection Filters for Emerging TIC Requirements: Axial and Radial-Flow Filter Designs, Edgewood Chemcial Biological Center ECBC-TR-497, May 2007, 31 pages.

Nixtox Steel Drum Adsorbers—brochure—Modular Activated Carbon Vapor Phase Adsorbers.

Enduro Odor Control Products—brochure—Radial-Flow Odor Control System—p. 4.

* cited by examiner

DEVICE AND METHOD FOR REMOVAL OF POLLUTANTS FROM GAS STREAMS

FIELD OF THE INVENTION

The present invention relates to devices and methods for removing pollutants and noxious substances from vapour streams.

BACKGROUND OF THE INVENTION

The issue of fugitive emissions around industrial facilities, chemical storage and transportation is an increasingly important problem to solve. Governmental limits on allowable levels of polluting or noxious substances in fugitive emissions are becoming more stringent and more strictly enforced. In the oil and gas industry in particular, vapours that become released from oil and gas refinement, processing and storage must be essentially free of Benzene, Toluene, Ethyl-benzene, and Xylene (BTEX), sulfur compounds and volatile organic carbon molecules (VOCs) before being ventable or otherwise releasable to the environment. These chemicals in fugitive emissions are a constant problem from oil field carriers and tanks.

As the air within a tank, pipe, vessel or carrier is displaced with fluids from oil field wells, that air will inevitably contain at least a minimal level of typical complex oil field vapours, including VOCs. These are generally classified by carbon length, methane being C1, octane being C8 for example. In addition to VOCs there are a subset of VOC's referred to as BTEX, which are a complex composite of organic molecules which have low odour threshold and in some cases are known carcinogenic molecules. In some cases there are also sulfur bearing organic molecules which can be thiols, mercaptans and $H_2S$ which have a very low threshold limit value (TLV). While the presence of these chemicals may only be in the parts per million (ppm) range, it is still required that these chemicals be removed substantially entirely.

A number of systems have been developed in the past and tested on the market with varying results.

Liquids have commonly been used as a filter medium to remove chemicals from gas streams that are bubbled through liquid. However, handling of liquid filtration media is complicated, heavy and can lead to spills. Filtration using liquid media often leads to solids and sludge which are difficult to remove. Filtration equipment using liquid filtration media is also typically not very flexible in how it can be arranged or connected, without risking spilling. Furthermore, spent liquid media is often a hazardous substance which needs special care and increase costs to handle and dispose of.

EP 110262061 describes an air filter system where a sorbent filter is made in a pleat web pack design. US 20130292001 describes an air purification system, specifically for a gas mask filter cartridge and a method to fill a sorbent inlet. U.S. Pat. No. 4,559,066 describes a filter cartridge where a sorbent bed receives the gas stream and gas flow radially outward from the sorbent bed, it is a low capacity system with a pleat pack filter on an outer surface of the system, and with a permanent cartridge. U.S. Pat. No. 2,728,409 describes a method of filtering gases with a vaned, radially directed gas inlet contained in a canister.

However, there is still a need for a design that effectively removes noxious substances from fugitive emissions streams that is portable, reusable, simple to install, flexible in its installation arrangement, can vary in capacity of filtration needs and can be safely hauled to and from an industrial site.

SUMMARY

A filtering device is provided for filtering pollutants from a gas stream. The device comprises a cartridge comprising an inner perforated passage, an outer perforated jacket, one or more non-perforated ends and a sorbent bed contained between the inner passage and the outer jacket; and a outer shell containing said cartridge and having a first port in fluid communication with said inner perforated passage and a second port in fluid communication with said outer perforated jacket. A flowpath of the gas stream into any one of the first port or the second port, through said sorbent bed and out of the other of the first port or the second port is a bidirectional flowpath.

A method is further provided for filtering pollutants from a gas stream. The method comprises the steps of allowing the gas stream to flow into a filtering device in a first direction, said device comprising a cartridge having a sorbent bed contained therein; directing the gas stream to bend in a second direction differing from the first direction as it enters the sorbent bed; and allowing the gas stream to pass through the sorbent bed and to exit the device.

It is to be understood that other aspects of the present invention will become readily apparent to those skilled in the art from the following detailed description, wherein various embodiments of the invention are shown and described by way of illustration. As will be realized, the invention is capable for other and different embodiments and its several details are capable of modification in various other respects, all without departing from the spirit and scope of the present invention. Accordingly the drawings and detailed description are to be regarded as illustrative in nature and not as restrictive.

BRIEF DESCRIPTION OF THE DRAWINGS

A further, detailed, description of the invention, briefly described above, will follow by reference to the following drawings of specific embodiments of the invention. The drawings depict only typical embodiments of the invention and are therefore not to be considered limiting of its scope. In the drawings.

The drawing is not necessarily to scale and in some instances proportions may have been exaggerated in order to more clearly to depict certain features.

DETAILED DESCRIPTION OF VARIOUS EMBODIMENTS

The description that follows and the embodiments described therein are provided by way of illustration of an example, or examples, of particular embodiments of the principles of various aspects of the present invention. These examples are provided for the purposes of explanation, and not of limitation, of those principles and of the invention in its various aspects.

The present invention comprises a device, preferably in the form of a canister, for odour remediation, reducing pollutant chemicals in fugitive air emissions and creating a safer work environment. More particularly, the present canister can be used for removal of VOCs, BTEX and sulphur compounds The present canister provides a unique bi-directional flow arrangement and can be mounted in any number of ways.

In the present invention, air or vapour to be filtered enters either through an end or through the side of the canister and treated air or vapour exits through either the end or the side of the canister after being forced through a sorbent bed located in a cartridge within the canister, to remove contaminants. The type of sorbent media used is variable and can be chosen based on the type of chemicals in the vapour to be treated.

With reference to the Figures, the present invention comprises canister 100 comprising an outer outer shell 2, preferably having a lidded end 4 with a first vapour outlet/inlet 6, a side wall 8 with a second vapour outlet/inlet 10, and an optional drain 12. The outer shell 2 preferably has a volume in the range of 5 to 100 US gallons and more preferably 30 US gallons or less, but it would be well understood by a person of skill in the art that the outer shell 2 can be designed with any suitable volume required for the application and with any range of dimensions, to achieve the desired filtration, footprint or floor size restrictions, provide good stability and ease of transport. Canisters having a size in the range of 30 US gallons or less are more preferred due to ease of filling with filtration media and transportability, but as indicated other sizes are equally usable. While a cylindrical outer shell 2 is represented, it would be well understood by a person of skill in the art that any number of shapes for the outer shell 2 are possible, including rectangular prisms, funnel shaped, etc. It would also be understood that while planar outer shell ends 4, 14 are shown in the figures; the ends 4, 14 can just as easily be convex or concave, depending on pressure rating requirements.

Figure 4:
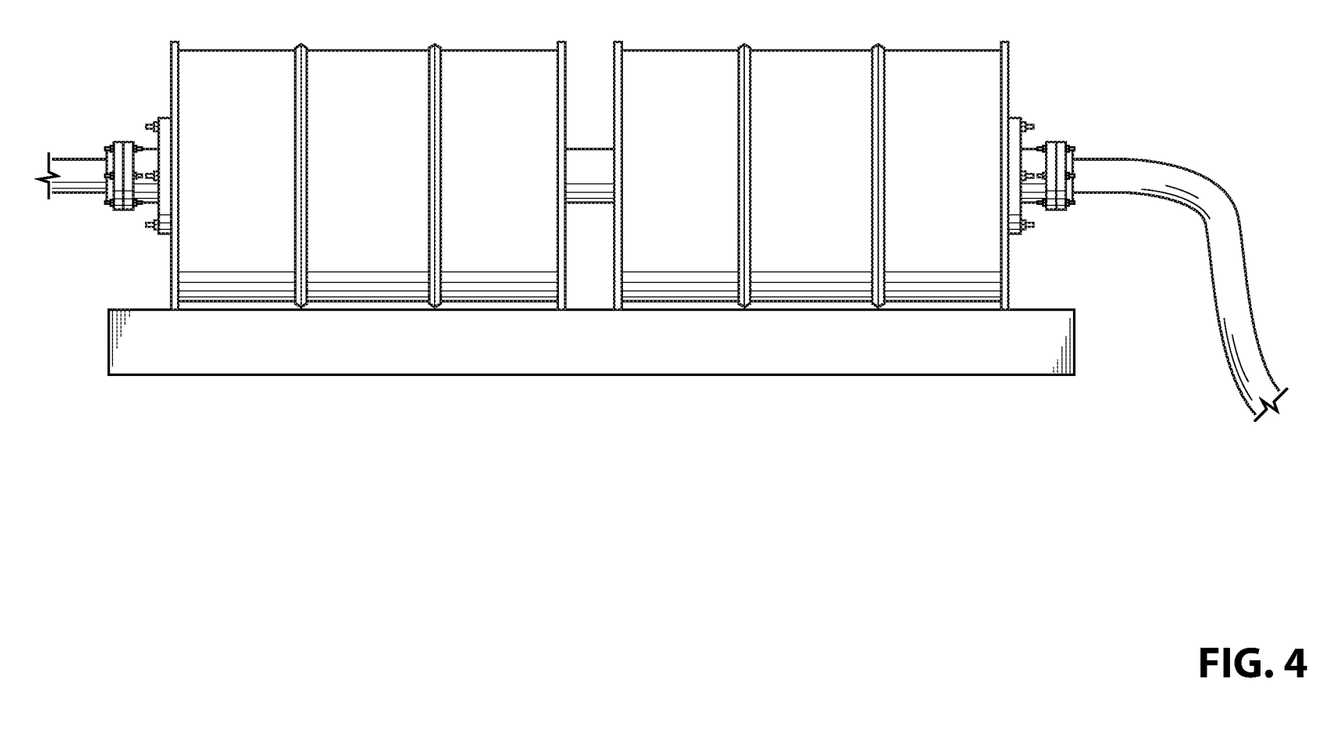
FIG. 4 is a perspective view of two filter devices of the present invention, connected in series with one another.
Figure 5:
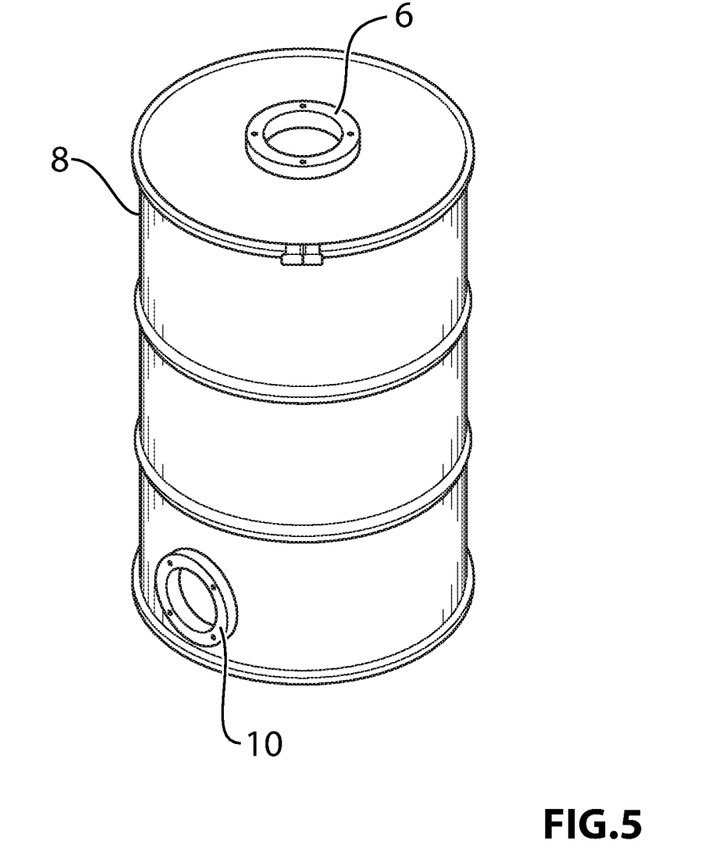
FIG. 5 is a perspective view of a filtration device of the present invention, showing the outer shell of the device and related connections.

The shell 2 can be composed of different materials suitable for the application such as steel, stainless steel, fiberglass or polymeric. In the case of the canister 100 being used in mobile applications, such as when the device is mounted on a truck bed, and often in a horizontal configuration, as illustrated in FIG. 4, the weight of inlet and outlet lines connected to the canister 100 in use and the vibrations resulting from transportation, can cause damage to the outer shell 2. In such cases, the outer shell may preferably be made from heavy gauge steel to provide additional strength. In a preferred embodiment, a coating may be applied to an inside surface of the outer shell 2, with various coating for chemical resistance, anti-corrosion and other features, with a coating such as an epoxy.

The canister 100 further comprises a removable cartridge 16 that can be inserted inside the outer shell 2. The cartridge 16 comprises an inner, perforated passage 18 and an outer perforated jacket 20. The volume 30 defined between the inner passage 18 and the outer jacket 20 is filled with a sorbent bed 32, which is discussed in more detail hereinafter. Both ends 22a, 22b of the cartridge are solid and allow no flow through them. The cartridge 16 and the outer shell 2 are both preferably of a size and weight that are easily lifted and handled by an individual operator without the need for other equipment or supports.

Figure 1:
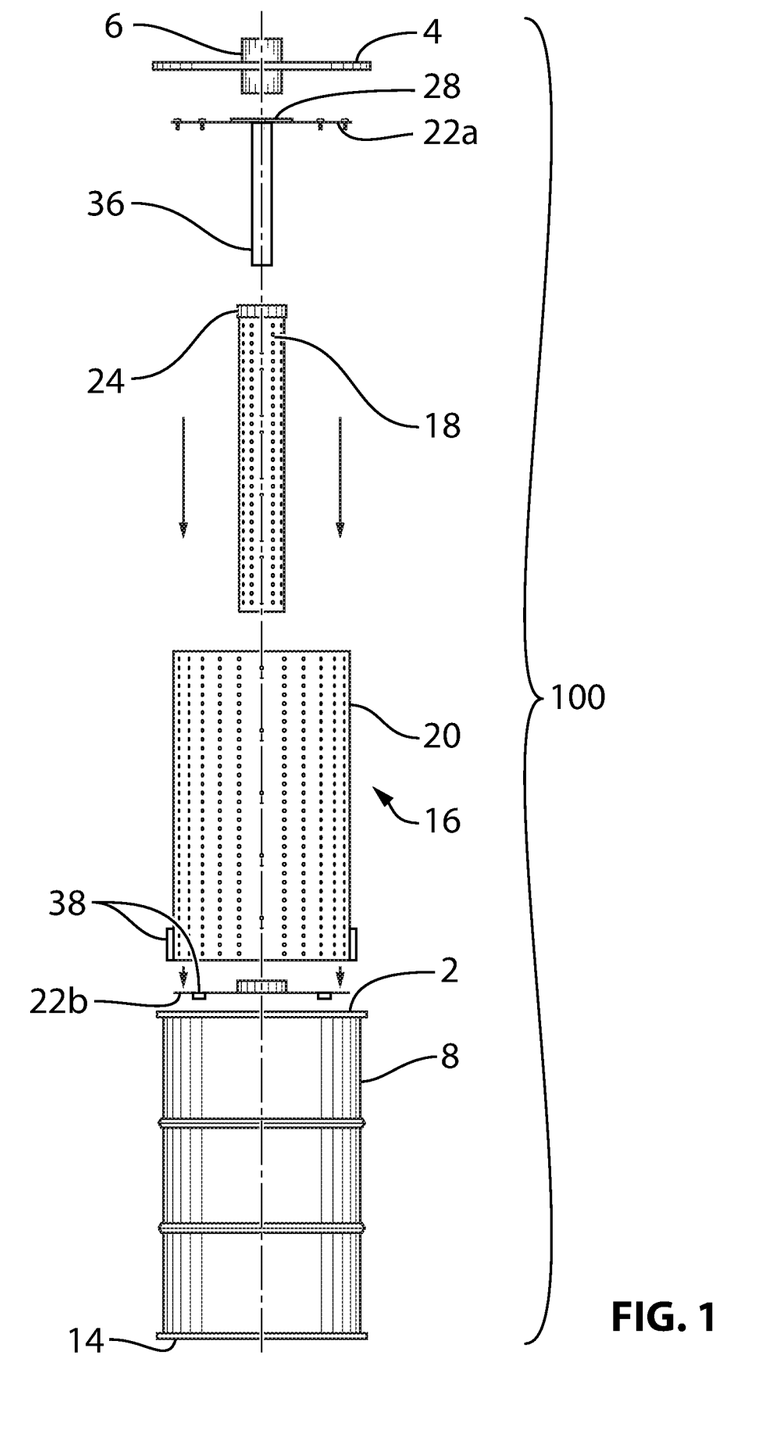
FIG. 1 is an exploded elevation view of one embodiment of a filter device of the present invention.
Figure 2:
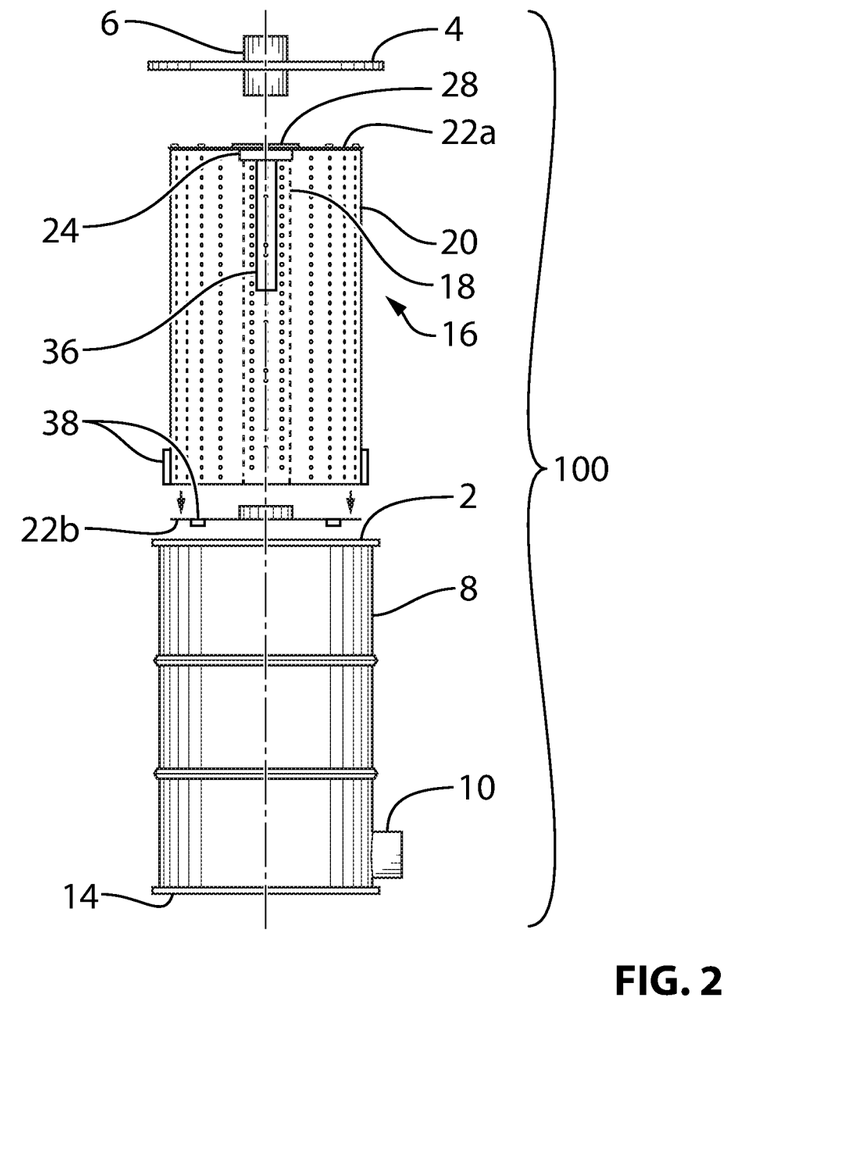
FIG. 2 is an exploded elevation view of another embodiment of a filter device of the present invention.
Figure 3:
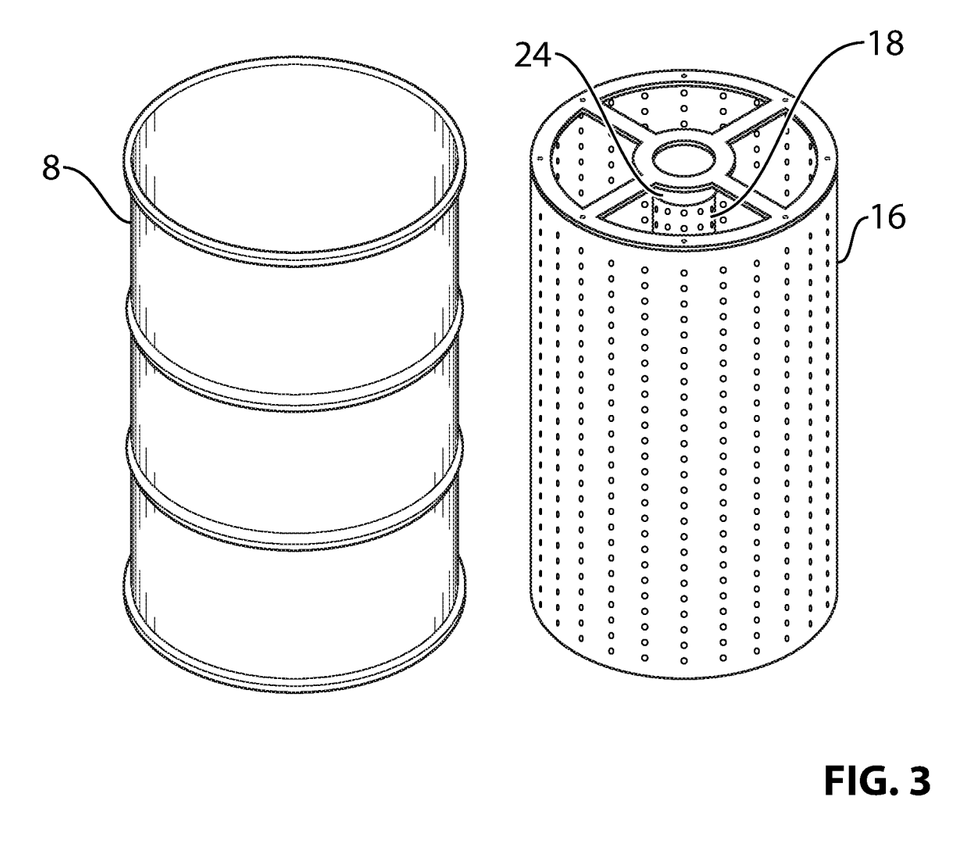
FIG. 3 is a perspective view of parts of one embodiment of the filter device of the present invention.

While the second vapour port 10 is illustrated in FIG. 2 as extending from the sidewall 8 of the outer shell 2, it is also possible and included within the scope of the present invention that the second vapour port 10 be located in the end 14 of the outer shell 2 that is opposite the end 4 through which the first vapour port 6 extends. This embodiment is illustrated in FIG. 4. In either of these arrangements, the second vapour port 10 is in flow communication with an annular space 34 between the outer perforated jacket 20 and the outer shell 2. Solid ends 22a and 22b prevent in any communication between the vapour port 10 and the cartridge 16, as will be further explained later.

In a preferred embodiment, a non-perforated collar 24 covers an initial, upper portion of the inner perforated passage 18. The purpose of the collar 24 is to prevent air or vapour that enters the cartridge 16 from entering a portion of the volume 30 near an upper end of an upright canister 100 that may be void of sorbent media 32, in the case of a cartridge 16 not being completely filled with sorbent media 32. The non-perforated collar 24 more preferably extends for two inches of an upper portion of the inner perforated passage 18.

Figure 6A:
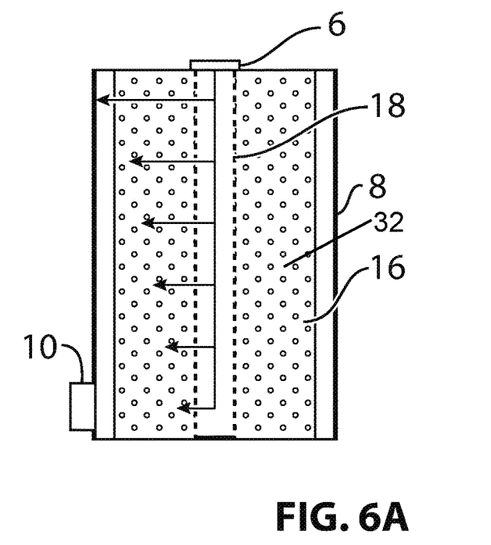
FIGS. 6a to 6d are flow path diagrams illustrating a variety of flow path issues and how they are address by the present invention.
Figure 6B:
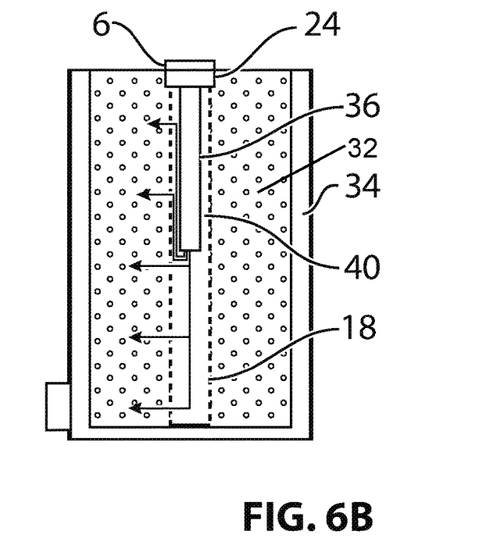
Figure 6C:
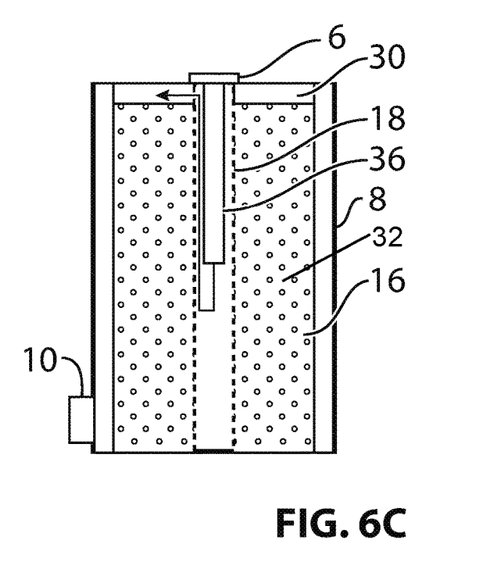
Figure 6D:
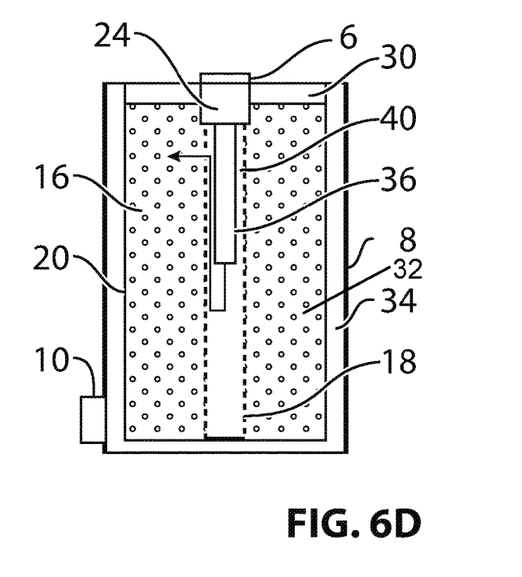

With reference to FIGS. 6b and 6d, and particularly in cases when the present canister 100 is used in an upright position with first vapour port 6 being the vapour inlet, an end 22a of the present cartridge 16 proximal the first vapour port 6 is preferably fitted with a non-perforated sleeve 36 that extends into a length of the inner perforated passage 18. As illustrated in FIG. 6A a premature breakthrough at a top of the sorbent bed 32 can occur without the non-perforated sleeve 36, as gas flow from the inner perforated passage 18 tends to focus in the top of the sorbent bed 32. FIG. 6c illustrates how the absence of a non-perforated collar 24 may lead to gas flow short circuiting through a void 30 in the sorbent bed 32, leading to premature breakthrough. In a system as indicated FIG. 6A the premature breakthrough is detected by a slow steady increase in the contaminate effluent. In the system of FIG. 6C, breakthrough is detected early on and suddenly since contaminated gas flows through a void 30, it is also detected by an abnormally low pressure differential across the cartridge 16. As illustrated in FIGS. 6b and 6d, said non-perforated sleeve 36 is smaller in diameter than the diameter of the inner perforated sleeve 18, thereby creating an annular channel 40 there between. As illustrated in the flowpath diagrams of FIGS. 6b and 6d, the non-perforated sleeve 36 ensures that air or vapour inlet flow is directed into the sorbent bed 32 and evenly distributed over a length of the sorbent bed 32. Together with non-perforated collar 24, the non-perforated sleeve 36 serves to reduce the chance of air or vapour flow bypassing the sorbent bed 32 and ending up in a potentially empty section of the volume 30. Uniform distribution of air or vapour to be treated across the sorbent bed ensures that all of the bed 32 is used in filtration, which extends the life of the sorbent bed 32. This also ensures that no vapour bypasses filtration through the sorbent bed 32. In more preferred embodiment, the non-perforated sleeve 36 extends one third (⅓) to halfway (½) down the inner perforated passage 18.

In a further embodiment of the present invention, it is also possible for air or vapour to enter the present canister 100 through the second vapour port, located in either the sidewall 8 or the end 14 of the outer shell 2. To ensure even distribution of air or vapour through the sorbent bed 32 in this arrangement, the canister 16 is sized to allow for a predetermined annular space 34 between outer perforated jacket 20 and the outer shell 2. The annular space 34 extends around a circumference of the outer perforated jacket 20. In the case where second vapour outlet/inlet 10 is located in the end 14 of the outer shell 2 the annular space 34 preferably also extends beyond the end 22*b* of the cartridge 16.

Annular spacing 34 is achieved by one or more spacers 38 arranged on the outer perforated jacket 20 and the end 22*b* of the cartridge. In a preferred embodiment, the spacers 38 can take the form of spacer tabs, rings or a frame or rails that can be arranged on the outer perforated jacket 20. A person of skill in the art would appreciate that any number of spacer 38 configurations are possible to both provide annular space 34 and not inhibit vapour flow out of outer perforated jacket 20 and that any and all such configurations are included within the scope of the present invention.

The annular space 34 allows for even dispersion of the vapour out of the outer jacket 20 and thus even absorption across the length of the sorbent bed 32. The spacing also creates a pressure drop in the vapour entering the canister 100 which promotes even distribution and also which prevents the inlet vapour from impinging against one side or area of the outer jacket 20. The annular space 34 and its volume are preferably sized based on the flow rate of air or vapour to be treated, and the cartridge 16 sizing relative the outer shell 2 is sized accordingly. The annular space 34 is preferably sized large enough to reduce or prevent flow restrictions and excessive pressure increase between the cartridge 16 and the outer shell 8, which can potentially lead to the shell 8 getting over pressured or potentially cracking from overpressure.

In a further optional embodiment, while not require, it is also possible to add heat tracing to the canister 100 to prevent the vapour inlets/outlets 6, 10 or sorbent bed 32 from icing up and freezing. This can occur in tank venting operations because of low flow of high temperature, high humidity vapour at sub zero conditions. In such cases, heat tracing can reduce or prevent temperature drops in the vapour stream that can lead to moisture condensing out of the vapour and freezing.

In the present invention, the sorbent bed 32 is preferably filled through a technique called snowstorm filling. The result of this filling technique is a high packing density of sorbent media. The high packing density provides considerably higher filtration capacity, and in turn longer service life of the sorbent. However, it would be understood by a person of skill in the art that any other number of means for filling the sorbent bed 32 with the granular sorbent media would be suitable for the purposes of the present invention.

Once filled, the sorbent media is fully contained in the cartridge 16 and there is no contact or exposure of the media to an operator or to the environment. In this way, the present canisters when loaded are not sensitive to the environment, temperature or moisture.

Suitable sorbent media possible for use with the present invention are preferably selected based on the pollutant vapour that needs to be removed. For example, one type of sorbent media may be selected for VOC's including BTEX, and sulfur compounds including H2S. Another type of sorbent media may be used in applications with considerably higher sulfur compound content, including higher H2S content.

The sorbent media is preferably a dry granular material that is non-hazardous and has an enhanced capture capacity.

The sorbent bed 32 as filled and arranged in the present canister, with the present flow regime, is capable of filtering pollutant chemicals in the range of 0.3:1 to 1:1 by weight percent. This means that each kilogram of the sorbent media has been observed by the present inventors to capture from between 0.3 to 1 equal kilogram of pollutant gas. Thus, a single canister 100 of sorbent media can remove noxious vapours from a large volume of air or vapour to be treated, before becoming fully spent.

The preferred present sorbent media, once spent, can be fully regenerated through the application of steam and/or heat, meaning that the sorbent material can be reused and recycled once regenerated.

In a further advantageous aspect, the present preferred sorbent media when spent can be desorbed of pollutant chemicals by passing clean air through the canister 100 in the same way as air to be treated is directed. This application of desorbing pollutants out of the sorbent media can be used in cases where a tank is being emptied of a chemical product and the present canister is connected to a vent end of such a tank and draws atmospheric air from outside through the canister 100 and into the tank. In this way, a canister 100 can repeatedly be used on a tank vent of a tank that is repeatedly filled and emptied.

Since the present cartridge 16 is preferably small enough to be handled by a single operator, a spent cartridge is easily removed and replaced.

By way of example only and by no means limiting to the scope of the present invention, activated carbon may be used as a most preferred media to remove hydrocarbons like VOCs and BTEX and to some degree H2S and mercaptans. A most preferred sorbent media for removal of high content sulphur streams, such as those with high contents of H2S and mercaptans, can be extruded carbon, such as treated bitumen based extruded carbon. Other solid sorbent materials known in the art such as zeolites, granulated iron oxides and impregnated activated carbons are also useable with the present invention; however these sorbents are not regeneratable. Furthermore, impregnated activated carbons can pose a risk of leaching out chemicals that they are impregnated with.

Airflow through the canister 100 is both axial and radial and is more preferably bi-directional. In one embodiment, air to be treated can enter the cartridge 16 from the first port 6, through the passage collar and into the inner perforated passage 18. Since the ends 22 of the cartridge are non-perforated, the vapour is forced through the sorbent bed 32 in a radially outward direction and then exit through the annular space 34 between the outer perforated jacket 20 and the outer shell 2. The solid collar 24 and the non-perforated sleeve 36 ensure even distribution of the vapour flow along a length of the sorbent bed and ensure no bypassing. The treated vapour then exits the outer shell 2 through the second port 10 at the side of the outer shell 2, from where it can be vented to atmosphere or transported elsewhere.

In a second embodiment, air to be treated enters the canister 100 from the second port 10 at the side 8 or end 14 of the outer shell 2 and into the outer perforated jacket 20. Annular space 34 between the outer jacket 20 of the cartridge and the shell 2 ensure even distribution of the vapour along a length of the sorbent bed and ensure no impinging. Since the ends 22 of the cartridge 16 and outer shell 2 are non-perforated, the vapour is forced through the sorbent bed 32 in a radially inward direction and into the inner perforated passage 18. The vapour then travels axially through the inner solid sleeve, and exits the outer shell 2 through the first port 6, from where it can be vented to atmosphere or transported elsewhere.

To ensure no vapour leakage between the cartridge 16 and the outer shell 2 or from the outer shell 2 to atmosphere, the lidded end of outer shell 2 preferably seals directly onto the non-perforated end 22 of the cartridge 16 using a standard gasket 28.

With reference to FIGS. 6a to 6d, the path of airflow or vapour flow in the present invention advantageously takes a substantially 90 degree turn; either from an axial inflow to a radial out flow, or vice versa. The inventors have found that a substantially right angled bend in the flow path aids in reducing or eliminating the occurrence of channeling through the sorbent bed 32. Channeling refers to the effect of vapour either bypassing the sorbent bed or tending to create a channel through the sorbent media. This empty channel forms a path of least resistance and can cause the vapour to travel through the canister substantially unfiltered. Channeling can be detected by a gradual increase in pollutant chemicals detected in the outlet stream of treated vapour. Detection of channeling and premature breakthrough differs from detection of a fully spent cartridge in that a fully spent cartridge results in a sudden, large increase in pollutant detection in the outlet stream.

Unlike many prior art filters in which airflow is substantially linear, the present invention ensure a fuller, more even distribution of the air or vapour to be treated over the entirety of the sorbent bed 32. The present flow patch arrangement provides high volume filtration with low-pressure drop across the canister 100. By reducing channeling, the useable life of the cartridge 16 and sorbent bed 32 is increased because premature breakthrough is reduced or eliminated and fuller sorbent bed usage is ensured.

Radial flow through the sorbent bed 32 ensures reduced channeling and more complete filtration and more complete use of the sorbent bed 32. More generally, any flow orientation through the sorbent bed 32 that is at a substantially 90 degree angle to the inlet air/vapour orientation would also achieve this result and is included in the scope of the present invention.

While a substantially 90 degree bend in air or vapour flow path is most preferred, it would be well understood by a person of skill in the art that wider or more acute bend angles are also possible without departing from the scope of the present invention. For example, while not being limiting, a bend in the range of 45 to 135 degrees is also included within the scope of the present invention. A bend in the flow path of the air or vapours to be treated also serves to knock out any liquid or solid particulate in the vapour stream, said liquid or solid particulate falling by gravity to a lower region of the canister 100 from where it can be removed via drain 12. The drain 12 can be positioned in a lower region of the canister 100 regardless of the orientation of the canister 100.

In other cases a drain 12 may be excluded from the shell 2, to avoid a source of potential leaks in sealed units.

The present device is capable of removing VOCs, BTEX and sulphur compounds like H2S and mercaptans from vapour streams, as well as eliminating odours from such vapour streams. Common applications of this device can be on oil & gas tank vents, oil field fluid haulers, vacuum trucks, freighters, and frac flow back vents during on-loading, off-loading and production. Other applications include truck vent capture, in which the present invention has been used to treat an airstream at a flow rate of up to 70 cubic feet per minute (cfm) or 2 m³/min, and has successfully captured VOC's, BTEX, and sulfur compounds including H2S and mercaptans with a pressure drop of less than ⅛" water, or 0.03 kPa. The present device has also be used on fugitive vapour from vacuum trucks having large flow rates of up to 1700 cfm or 48 m³/min and has shown good filtration with a pressure drop of less than 2" water or 0.5 kPa. The present system has also been used on venturi exhaust systems.

The present invention can also be connected to any number of air movement systems such as a motorized fan system on either of the ports 6, 10 to draw vapour through the canister, such as for use on a tank extraction system. The air movement system could also be an educator venturi air system as mentioned earlier.

Extended applications beyond oil & gas would include refineries, pulp and paper industries and venturi air movers used during tank purging during downtime and/or maintenance. The present device can also be used when filling or emptying bulk cargo carriers including ship cargo carriers.

The first and second ports 6, 10 can be made in any number of sizes to suit industrial applications and common connection port sizes. More preferably, the first and second ports are sized as either 3" or 6" OD.

In an optional embodiment, a free water knockout (FWKO) system can be added to an inlet of the system to remove liquid from the vapour stream before entering the canister 100. Often, the vapour stream is hot and has a very high relative humidity and condensable petroleum products. A FWKO vessel on the inlet allows for cooling, active or passive, and collection of that liquid before the vapour stream enters canister 100. The result is extended service life since liquids do not collect within the canister and do not cause rusting etc. Furthermore, some sorbents can be moisture sensitive and as such, use of such a FWKO system can be beneficial in such cases.

The present canister 100 can be mounted vertically or horizontally. Since the present sorbent bed 32, when preferentially snowstorm filled, is tightly packed, any orientation of the canister can be used without concern for the sorbent bed settling due to gravity. Multiple canisters 100 can also be arranged in parallel and connected to a manifold of gas lines for large-scale use. In such arrangements, canisters 100 could be manifolded with an optional switching system such that when a canister 100 is spent, the vapour flow can be switched to a new canister 100 on the manifold either manually or automatically.

It is further possible to connect the present canisters 100 in series—to allow the vapour to pass through multiple canisters for further filtration, with either the same or different sorbent media in each canister 100. It is also possible orientate the canisters 100 in standard sea cans or similar shipping containers with a manifold for use on freighter decks.

Pressure drops across the canisters 100 of the present invention have been measured to be very low, in the order of less than 0.125 inches of water (0.03 kPa).

In use, one or more canisters 100 are each connected to a vapour stream line to be treated. As indicated earlier, the present canister 100 can be mounted vertically or horizontally. The drain 12 on the bottom side of the outer shell 2 serves for removal of water condensation, and is usable regardless of the orientation of the canisters 100 so long as the drain 12 is positioned low. While the present canister 100 is unaffected by moisture, it is preferably drained occasionally. Saturation of absorption of noxious gases by the sorbent bed 32 is detected by the detection of any one of the noxious gases at the outlet 6, 10 of the canister 100, which indicates that a particular unit is exhausted. Any number of gas detection means can be used for such detection at the outlet and would be well known by a person of skill in the art and are included in the scope of the present invention. At that time the canister is exchanged with another unit and the spent canister is regeneration for future use. As mentioned early, the present method includes regeneration of the granular sorbent media, rather than disposal which is more common in prior art sorbent media or filtration methods.

Further optionally, an end of service life (ESL) indicator can also be added to the outlet. The ESL can be a chemical sensor on the outlet, electronic or passive, alarmed or visual, or it could be a flow rate monitoring system, such as a hot wire or turbine anemometer that can be used to monitor flow through to confirm canister max flow is not exceeded. Such a flow rate monitor when used as an ESL indicator indicates if a total volume limit is determined for canister life. Optionally, a telemetry system can be used to report ESL readings to a central location, which is beneficial in the case of the present systems and devices being used in remote locations.

In an optional embodiment, a temperature monitoring system may be installed within the canisters. Since there is the property of some sorbents called heat of absorption which can generate heat, some sorbent which have significant heat of absorption such as impregnated carbons could be monitored so they do not exceed temperature threshold.

In an optional embodiment, pressure sensors may also be included on either or both vapour ports 6, 10 and can be used to monitor pressure drop increase through canister as an indicator of if the unit is beginning to become plugged for any reason. Pressure sensors can detect either absolute or differential pressure and can be electronic or analog, such as a magnehelic manometer. Pressure sensors can additionally be used to monitor leakage in a sealed unit, and can be used to monitor over pressure and used as a flow limiter for shut down.

EXAMPLES

The following examples are meant to be illustrative only, but are by no means limiting to the scope of the present invention:

For the purposes of the following examples, gas to weight calculation is determined as follows:

$$mg/m^3 = (ppm \times gram\ molecular\ weight)/(24.45),$$

where 24.45 is the mole volume in air at 1 atm and 25 C.

Using this calculation:

$$700\ ppm\ H2\ in\ mg/M^3\ is\ (700\times34)/(24.45)=973.4\ mg/m^3\ or\ 0.97\ g/m^3$$

$$5\ ppm\ Benzene\ in\ mg/M^3\ is\ (5\times87)/(24.45)=17.8\ mg/m^3\ or\ 0.0178\ g/m^3$$

Example 1

1000 cubic meters of 5 ppm BTEX yields less than 1 kg of BTEX (the 5 ppm is an estimate based on typically measured BTEX in trucks being from 2-5 ppm).

with a removal capacity of 1:1, 1 kg of sorbent medium is capable of treating 1000 m³, or 30 truckloads of 5 ppm BTEX

Example 2

For a total sorbent bed weight of 35 kg per canister, the capacity of the sorbent is:
for a 1:1 capacity for BTEX, 35 kg of BTEX, or over 35000 m³ of a stream containing 5 ppm BTEX can be treated;
for a 0.3:1 capacity for H2S, 1KG of H2S or 340 m³ of a stream containing about 500 ppm of H2S can be treated;
for a capacity of 0.3:1 capacity for H2S, 10.5KG of H2S, or a 15000 m³ stream containing about 500 ppm of H2S can be treated;

Example 3

A single canister system of the present invention was fed with a stream containing:
4000 ppm of total VOC's;
5 ppm of BTEX;
40 ppm of H2S
The gas composition at the outlet of the canister was measured and found to contain:
90-95% of the total VOC's removed;
all of the BTEX removed;
all of the H2S removed

Example 4

Summary Data is provided below for three samples composition treated in a canister of the present invention:

| Sample Composition | | SAMPLE 1 - taken at the start of the process | | SAMPLE 2 - taken midstream of the process | | SAMPLE 3 - taken midstream of the process | |
|---|---|---|---|---|---|---|---|
| | | INLET | OUTLET | INLET | OUTLET | INLET | OUTLET |
| Hydrogen Sulphide (H2S) | ppm | 10.0 | 0 | 10 | 0 | 40 | 0 |
| Methane (C1) | % | 0.581 | 0.421 | 1.237 | 0.577 | 0.209 | 0.103 |
| Ethane (C2) | % | 0.024 | 0.007 | 0.037 | 0.013 | 0.005 | 0.006 |
| Propane (C3) | % | 0.042 | 0.014 | 0.085 | 0.014 | 0.012 | 0.007 |
| I-Butane (IC4) | % | 0.063 | 0.004 | 0.115 | 0.003 | 0.011 | 0.002 |
| N-Butane (NC4) | % | 0.043 | 0.013 | 0.075 | 0.007 | 0.017 | 0.004 |
| 1-Pentane (IC5) | % | 0.076 | 0.017 | 0.125 | 0.011 | 0.036 | 0.006 |
| N-Pentane (NC5) | % | 0.012 | 0.014 | 0.015 | 0.012 | 0.016 | 0.007 |
| Hexanes (C6) | % | 0.003 | 0.004 | 0.004 | 0.004 | 0.005 | 0.002 |
| Heptanes (C7) | % | 0.001 | 0.001 | 0.001 | 0.001 | 0.001 | 0 |
| Octanes (C8) | % | 3.145 | 1.004 | 4.822 | 0.860 | 2.900 | 0.445 |
| Nonanes (C9) | % | 2.633 | 0 | 2.790 | 0 | 2.215 | <0.001 |
| Decanes+ (C10+) | % | 0 | 0 | 0 | 0 | 0 | 0 |
| Total | | 6.042 | 1.078 | 8.069 | 0.925 | 5.218 | 0.479 |
| % reduction | | | 82.158 | | 88.536 | | 90.820 |
| % reduction | | | 82.158 | | 88.536 | | 90.820 |

The previous description of the disclosed embodiments is provided to enable any person skilled in the art to make or use the present invention. Various modifications to those embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims. No claim element is to be construed under the provisions of 35 USC 112, sixth paragraph, unless the element is expressly recited using the phrase "means for" or "step for".

The invention claimed is:

1. A filtering device for filtering pollutants from a gas stream, said device comprising:
    a. a cartridge comprising an inner perforated passage, an outer perforated jacket, one or more non-perforated ends and a single sorbent bed comprising a single sorbent media contained between the inner passage and the outer jacket;
    b. an outer shell containing said cartridge and having a first port in fluid communication with said inner perforated passage and a second port in fluid communication with said outer perforated jacket; and
    c. an annular space between i) the outer perforated jacket and at least one non-perforated end of said cartridge, and ii) the outer shell, said annular space being free of any sorbent media,
wherein any one of the first port or the second port is used as an inlet for the gas stream, and any one of the other of the first port or the second port is used as an outlet, to thereby provide a filtering device configured for a filtration flowpath in one direction or in an opposite direction equal efficiency in both directions.

2. The filtering device of claim 1, wherein the cartridge is removably insertable within the outer shell.

3. The filtering device of claim 2, wherein the outer shell comprises a sidewall, a first end wall and second opposite end wall, and wherein said first port is formed in the first end wall of the outer shell and the second port is formed in any one of the sidewall and the second opposite end wall of the outer shell.

4. The filtering device of claim 3, wherein the at least one non-perforated ends of the cartridge prevent direct fluid communication between the inner perforated passage of the cartridge and the second port.

5. The filtering device of claim 4, wherein the flowpath of the gas stream includes a first axial direction and a second radial direction.

6. The filtering device of claim 4, wherein the flowpath of the gas stream includes a first radial direction and a second axial direction.

7. The filtering device of claim 4, wherein the flowpath of the gas stream takes a bend having an angle of from 45 degrees to 135 degrees.

8. The filtering device of claim 4, wherein the flowpath of the gas stream takes a bend having an angle of 90 degrees.

9. The filtering device of claim 4, further comprising a non-perforated collar covering a portion of the inner perforated passage adjacent the first port.

10. The filtering device of claim 9, further comprising a non-perforated sleeve extending into a portion of a length of the inner perforated passage, and having a diameter smaller than a diameter of the inner perforated passage to thereby define an annular channel therebetween.

11. The filtering device of the claim 10, wherein the annular space is created by inclusion of one or more spacers arranged between the outer perforated jacket and at least one non-perforated end of the cartridge, and the outer shell.

12. The filtering device of claim 11, wherein said one or more spacers are selected from the group consisting of spacer tabs, spacer rings, a frame and rails arranged on the outer perforated jacket and at least one non-perforated end of the cartridge.

13. The filtering device of claim 12, wherein a volume defined by said annular space is sized based on the flow rate of the gas stream.

14. The filtering device of claim 13, wherein the outer shell is made from a material selected from the group consisting of steel, stainless steel, fiberglass and polymeric materials.

15. The filtering device of claim 14, wherein the cartridge is filled with the sorbent media by snowstorm filling to form the sorbent bed.

16. The filtering device of claim 15, wherein the sorbent media is a dry granular material.

17. The filtering device of claim 16, wherein the sorbent media is regeneratable.

18. The filtering device of claim 16, wherein the sorbent media is selected from the group consisting of activated carbon, extruded carbon, treated bitumen based extruded carbon, zeolites, granulated iron oxides and impregnated activated carbons.

19. The filtering device of claim 1, wherein said device is mountable in an orientation selected from vertically and horizontally.

20. The filtering device of claim 1, wherein the device is connectable to one or more further devices in parallel and to a manifold of the gas stream.

21. The filtering device of claim 1, wherein the device is connectable to one or more further devices in series.

22. The filtering device of claim 21, wherein a sorbent media of the sorbent beds of the one or more further devices in series are the same or different as the sorbent media in the device.

23. The filtering device of claim 1, further comprising one or more gas detection means at one or both of the first port and the second port.

24. The filtering device of claim 1, further comprising a temperature monitoring system installed within the device.

25. The filtering device of claim 1, further comprising one or more pressure sensors on one or both of the first and second ports to monitor pressure drop through the device.

* * * * *